July 21, 1942.   H. WATERMAN   2,290,304
HIGH VOLTAGE CONDENSER
Filed Jan. 4, 1940
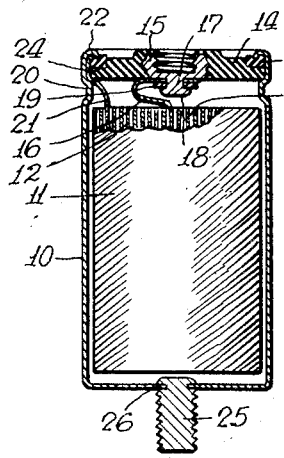
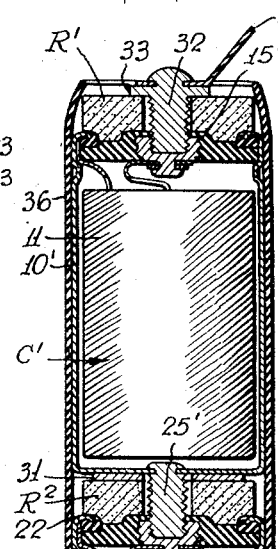
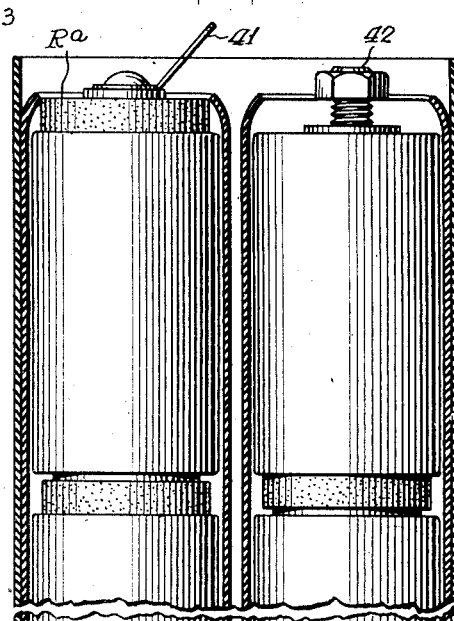
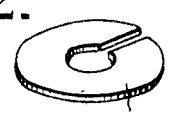
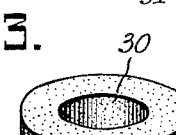
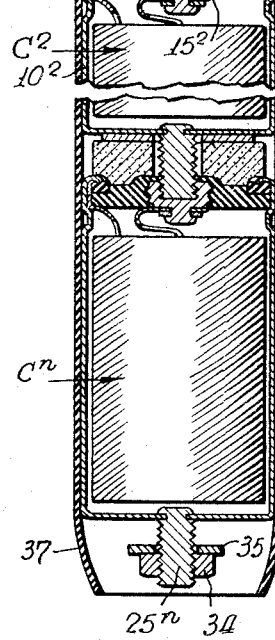
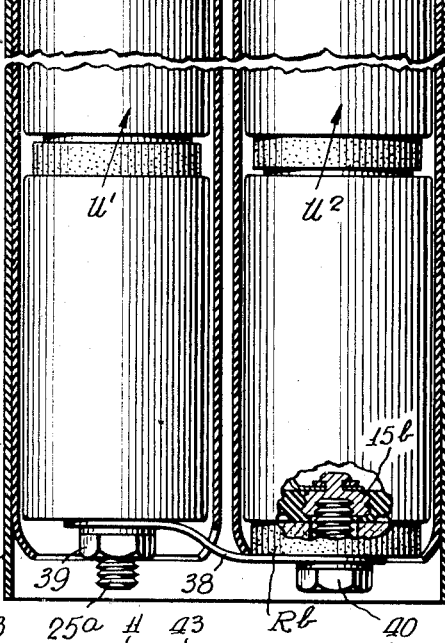
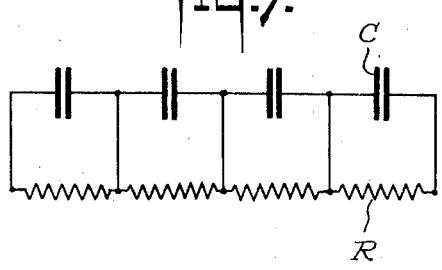
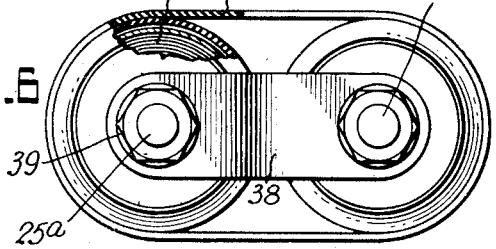
INVENTOR
*Herbert Waterman*
BY
*Dean Fairbank & Hirsch*
ATTORNEYS Patented July 21, 1942

2,290,304

UNITED STATES PATENT OFFICE 2,290,304

HIGH VOLTAGE CONDENSER

Herbert Waterman, Collingswood, N. J., assignor to Aerovox Corporation, New Bedford, Mass., a corporation of New York Application January 4, 1940, Serial No. 312,332

11 Claims. (Cl. 175—315)

The present invention relates to condensers and more especially to electrolytic condensers of the tremendously high voltage type required in television receivers.

An object of the invention is to provide a condenser unit of the above type capable of taking voltages of over 1000, which unit shall yet be simple, inexpensive, compact and not subject to break-down in the event of a defect at one part thereof.

Another object is to provide a condenser of the above type which can be readily made up in accordance with requirements from standard sections, to accommodate a corresponding predetermined high voltage.

According to the invention, the unit is made up of a multiplicity of condenser sections, each of which comprises an electrolytic condenser cartridge unit, preferably of the dry type, with terminal conformations at the opposite ends thereof, preferably respectively a plug and a socket of opposite polarity, that permit of plugging the sections in alignment and in series with each other. A resistance of high ohmic value is connected across the terminals of each condenser section, such resistance preferably comprising a carbon disk clamped between consecutive sections and formed with a central aperture through which the plug terminal of one section extends into the socket terminal of the contiguous section.

In the accompanying drawing in which are shown one or more of various possible embodiments of the several features of the invention, Fig. 1 is a view in longitudinal cross-section of one of the sections, Fig. 2 is a perspective view of the washer used, between consecutive sections, Fig. 3 is a view similar to Fig. 2 of one of the carbon disk resistors, Fig. 4 is a view in longitudinal cross-section with the median part broken away showing the assembled unit, Fig. 5 is a view similar to Fig. 4 except that the condenser sections are shown in side elevation, of another form of the invention involving a greater number of sections connected in series, Fig. 6 is a bottom plan view with parts broken away and shown in section, of the embodiment of Fig. 5, and Fig. 7 is a circuit diagram of the unit.

Referring now to the drawing, each section or element of the condenser unit comprises a metal cartridge 10, usually an aluminum can, which houses preferably a condenser roll 11, usually made up of two sheet metal foil electrodes 12 and interposed interspacers 13 carrying the electrolyte. The unit has a cover 14 which may be of molded insulating plastic material, in the middle of which is inset a metal terminal socket piece 15 to which is connected desirably the anode terminal tab 16 which in turn is desirably integral with the anode foil. For such connection the inner or lower face of the socket piece 15 is provided with a reduced stud 17 which is rolled at 18 over a washer 19 engaging the tab 16.

The insulating cover 14 rests at its rim at an inturned bead 20 in the can and desirably the tab 21 of the cathode is interposed between the rim of the cover 14 and the rim of the can to effect secure mechanical and electrical connection thereat, the rim of the can at that end being rolled over at 22 against a gasket 23 lodged in a corresponding peripheral recess 24 in the cover. Desirably a metallic stud 25 is riveted as at 26 to extend axially from the bottom of the can.

In general, the unit would be made up with the anode foil formed according to the teachings of Georgiev Patent No. 1,815,768 of July 21, 1931, and Rhodes Patent No. 2,019,994 of November 5, 1935, so as to be efficient on voltages of 500 or more.

A series of cartridge sections $C'$, $C^2$ ... $C^n$ identical with that described, are preferably connected into alignment by introducing the stud $25'$ of each unit into the corresponding socket $15^2$ of the contiguous unit, the stud $25^n$ at the lower end of the assembly serving as one terminal of the assembly and the socket $15'$ at the upper end serving as the other terminal of the assembly.

With the construction as thus far described, difficulty might be encountered in use because of the non-uniform distribution of voltage across series electrolytic capacitors. This non-uniform distribution is due to the variable leakage characteristics of electrolytic condensers, and when such units are connected in series and a voltage which is several times greater than the voltage of any one condenser is applied to the combination some sections will have more than their rated voltage applied to them thus causing the failure of such units. The action described is cumulative and eventually all condensers will fail due to excessive voltage.

Accordingly, it is desirable to connect across each condenser section C of the assembly a resistance R of high ohmage, as indicated diagrammatically in Fig. 7. The resistances R control the apportionment of the applied voltage, so that each condenser section in shunt with the corresponding resistance, will only take its proportionate share of the applied voltage. Even if a condenser section were defective, the corresponding resistance would take its share of the voltage and the total voltage applied to the remaining sections would be no greater than they can safely withstand.

In a preferred construction, the ohmic resistance R is in the form of an annulus of carbon imposing a tremenduously high resistance. These carbon annuli are interposed, as best shown in Fig. 4, between the contiguous ends of successive condenser sections, the stud 25 of the section thereabove extending through the central aperture 30 of the carbon disk into the socket 15 of the section therebelow. Preferably a split metallic washer 31 is interposed between the bottom of each condenser section and the carbon disk therebelow for more effective contact thereof with the can thereabove. The lower face of the carbon disk effects electrical contact as shown in the drawing, with the inturned rim 22 of the can therebelow. As appears best in Fig. 4, the carbon disk $R^2$ for instance, is electrically connected to the can 10' thereabove and, therefore, to the corresponding stud 25' which in turn, is electrically at the same potential as the anode socket terminal $15^2$, while the other face of the carbon disk is connected electrically to the rim 22 of the can $10^2$ to which the cathode terminal is joined. Thus, it will be seen that the carbon disk is connected in shunt with the associated condenser section therebelow as shown diagrammatically in Fig. 7.

While the plug and socket connections may be of the thrust type, it is preferred, as shown in the drawing, to thread each stud and correspondingly tap each socket terminal and also to provide a greater length of stud than depth of socket, so as to accommodate the thickness of the carbon disk R interposed between consecutive sections.

The extreme upper section 10' is preferably provided with a terminal comprising a special stud member 32, carrying the terminal lug 33. Stud member 32 is threaded into the socket 15' and affords a flange 33 connected to the upper face of the carbon disk R', which engages the rim of and affords the shunt connection across said upper section. The stud $25^n$ of the lowermost condenser section has a nut 34 and washer 35 thereon for terminal connection.

While the sections may be assembled as disclosed, without further enclosure, it is preferred, as shown in the drawing, to encase the assembly in an outer jacket 36 of insulating material, the extremities of which are constricted as at 37 after assembly, to prevent shifting of the sections therein.

By the construction described, it will be apparent that the assembly is affected with the utmost of ease to make up a unit of as many sections as is required for the particular circuit for which the unit is to be used. It will be apparent that if any one section should become defective, it may readily be replaced by a fresh section without the need for discarding the entire unit.

In the embodiment of Fig. 5 is shown a modification, especially useful for circuits of the higher voltages used in television receiving, for instance 20,000 volts and therefore, requiring say 40 condenser sections of 500 volts apiece connected in series.

As clearly indicated in the drawing, an assembled unit U', such as that shown in Fig. 4 is connected in series with a second similar assembled unit $U^2$ disposed in side by side relation therewith. The units are disposed in inverted relation, that is, with the extreme carbon disk $R^a$ uppermost on one unit and with such disk $R^b$ lowermost in the next unit. The two assemblies are connected in series by means of a metal strap 38 with eyes at opposite ends, one of which is superposed over the stud $25^a$ and is attached by a nut 39 and the other of which has a screw 40 threaded into the corresponding socket $15^b$ at the lower end of the other assembly $U^2$.

One terminal 41 of the entire assembly is at the top of the unit U', and the other terminal 42 thereof is at the top of the companion unit $U^2$. Desirably, in the assembly of Fig. 5, the entity is enclosed in a corresponding jacket 43 slipped thereover.

In like manner, the principle may be carried forward by connecting a third or a fourth unit assembly in series therewith in manner obvious to those skilled in the art.

As many changes could be made in the above construction and many apparently widely different embodiments of this invention could be made without departing from the scope of the claims, it is intended that all matter contained in the above description or shown in the accompanying drawing shall be interpreted as illustrative and not in a limiting sense.

Having thus described my invention, what I claim as new and desire to secure by Letters Patent is:

1. An electrolytic condenser unit capable of operating at thousands of volts, said unit comprising a multiplicity of individual electrolytic condenser cartridges, each capable of withstanding hundreds of volts, said cartridges being assembled in a stack electrically in series with each other and high resistance units interposed between the successive condenser sections, each said resistance unit affording a shunt connection between the terminals of the associated condenser section by direct contact with said terminals.

2. A condenser unit capable of withstanding thousands of volts, comprising a tubular container, a multiplicity of electrolytic condenser cartridges, each capable of withstanding hundreds of volts disposed in end to end series relation within said tubular container, each of said cartridges having its two terminals at one and the same end and having a metallic element at the other end thereof of the same potential as one of its terminals, said metallic element being connected to a terminal of the contiguous condenser cartridge, each of said cartridges having an associated resistance of high value connected to the respective terminals thereof by direct engagement therewith, and housed within said tubular container.

3. An electrolytic condenser for service on thousands of volts, comprising a multiplicity of cartridge sections, each useful at hundreds of volts, means connecting said cartridges in series in a stack, carbon resistance annuli disposed between consecutive cartridges for electrical contact therewith, and metallic connections between consecutive cartridges extending through the central opening of the intervening resistance disk.

4. An electrolytic condenser unit for operation at thousands of volts, comprising a multiplicity of individual dry electrolytic condenser cartridges, each capable of operating on hundreds of volts, each of said cartridges having a socket terminal at one end and a plug terminal at the other for convenient electrical connection of such cartridges in series and carbon resistance disks interposed between successive cartridges and held in electrical connection across the terminals of the associated cartridge.

5. An electrolytic condenser unit comprising a multiplicity of electrolytic condenser cartridges, each capable of withstanding hundreds of volts, each having a plug terminal of one polarity at one end and a socket terminal of opposite polarity at the other for plug and socket series connection of said cartridges, each of said cartridges presenting a rim at the socket end of polarity identical with that of the plug terminal at the opposite end thereof, and carbon resistance annuli interposed betwen consecutive cartridges and pressed in the assembly respectively for electrical contact of the corresponding cartridge rim and the plug end respectively of the cartridges between which it is interposed.

6. The combination recited in claim 5 in which the plug terminals are screw studs and the sockets are nipples of depth less than the length of the studs.

7. An electrolytic condenser unit for service at thousands of volts, comprising a series of dry electrolytic condenser cartridges, each capable of withstanding several hundred volts, each of said cartridges comprising a metallic cylindrical container having a metallic stud protruding from the bottom thereof, having the rim thereof rolled inward and electrically connected to one of the terminals thereof and an insulating cover retained by the rolled-in rim, said cover having a metallic socket to which the other terminal of the electrolytic condenser is connected, carbon disk resistors encircling the respective studs and interposed between consecutive cartridges, and establishing high resistance electrical connections between the can rim at one face thereof and the bottom of the contiguous can at the other face thereof.

8. An electrolytic condenser unit for service at thousands of volts, comprising a series of dry electrolytic condenser cartridges, each capable of withstanding several hundreds volts, each of said cartridges comprising a metallic cylindrical container having a metallic stud protruding from the bottom thereof, having the rim thereof rolled inward and electrically connected to one of the terminals thereof and an insulating cover retained by the rolled-in rim, said cover having a metallic socket to which the other terminal of the electrolytic condenser is connected, carbon disk resistors encircling the respective studs and interposed between consecutive cartridges and establishing high resistance electrical connection between the cam rim at one face thereof and the bottom of the contiguous can at the other face thereof, each of said carbon disk annuli having a split metal washer at the face thereof contacting the bottom of the contiguous container, the condenser at one extremity of the stack having a terminal piece threaded into the corresponding socket, said terminal piece including a flange and a carbon resistance disk pressed by said flange against the corresponding rolled-in rim, the terminal at the opposite end of the stack comprising the corresponding stud and having associated clamping means.

9. A condenser unit capable of withstanding thousands of volts, comprising an elongated generally cylindrical jacket, a multiplicity of dry electrolytic condenser cartridges enclosed in said jacket, each of said cartridges comprising a metal can, a dry electrolytic condenser unit therein, an insulating cover, the rim of said can being rolled inward thereover, a metallic socket through said cover, one terminal of the condenser unit being connected to said socket, the other to said rim, a metallic stud at the end of said condenser opposite that of said socket, carbon disk elements interposed between consecutive cartridges presenting a central aperture for engagement of the stud of one cartridge in the socket of the next one and establishing electrical connection from the bottom of one to the rim of its neighbor.

10. The combination recited in claim 9, in which two or more units as set forth are connected in series and disposed in side-by-side relation, one inverted with respect to the other, and means connecting the stud end of one unit with the socket end of the neighboring one.

11. The combination recited in claim 9, in which two or more units as set forth are connected in series and disposed in side-by-side relation by one being inverted with respect to the other, and the stud end of one unit being connected with the socket end of the neighboring one, a corresponding jacket enclosing the entity.

HERBERT WATERMAN.